W. PARTINGTON.
Apparatus for Cooling Malt Liquors.
No. 69,930.
Patented Oct. 15, 1867.
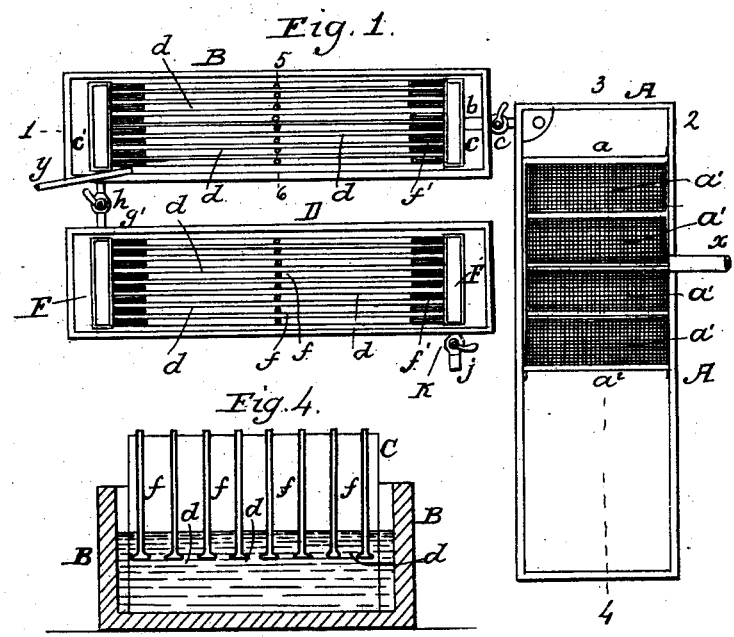

United States Patent Office.

WILLIAM PARTINGTON, OF PHILADELPHIA, PENNSYLVANIA.

*Letters Patent No. 69,930, dated October 15, 1867.*

---

IMPROVED APPARATUS FOR COOLING MALT LIQUOR.

---

*The Schedule referred to in these Letters Patent and making part of the same.*

---

TO ALL WHOM IT MAY CONCERN:

Be it known that I, WILLIAM PARTINGTON, of Philadelphia, Pennsylvania, have invented certain Cooling Apparatus for Malt and other Liquors; and I do hereby declare the following to be a full, clear, and exact description of the same.

My invention consists of certain apparatus, fully described hereafter, for rapidly reducing the temperature of malt and other liquors to any required degree.

In order to enable others skilled in the art to make and use my invention, I will now proceed to describe its construction and operation, reference being had to the accompanying drawing, which forms a part of this specification, and in which—

Figure 1 is a plan view of my improved apparatus for cooling liquors.

Figure 2, a longitudinal section on the line 1–2, fig. 1.

Figure 3, a section on the line 3–4, fig. 1, and

Figure 4, a transverse section (drawn to an enlarged scale,) on the line 5–6, fig. 1.

Similar letters refer to similar parts throughout the several views.

A is a shallow rectangular box or trough, in which a number of detachable sieves, $a$, $a^1$, and $a^2$, are so arranged as to form a separate compartment, as shown in fig. 3. The horizontal sieves $a^1$ are near to, but not in contact with, the bottom of the box A, and the vertical sieve $a$ is of finer texture than the rest, as shown in fig. 2, for a purpose described hereafter. B is a box or pan adjacent to and similar in shape to the box A, and within and near to one end of the same is a narrow upright vessel, C, open at the top, and communicating with the box A through a short pipe, $b$, on which is a faucet, $c$. At the opposite end of the box B is a similar open vessel, $C^1$, connected to the former by a number of flat pipes, $d$, the form and arrangement of which are best observed in fig. 4. A narrow tube, $f$, projects vertically from each of the pipes $d$, at a point about midway between the vessels C and $C'$, and the latter are also connected with the said pipes by inclined tubes $f'$, for a purpose described hereafter, (see fig. 2.) D is a box precisely similar to the box B above described, and has vessels F and F', connected by flat pipes $d$, as shown in fig. 1. The vessels $C'$ and F are connected by a pipe, $g$, on which is a faucet, $h$, and from one side of the vessel F' projects an outlet pipe, $j$, having a similar faucet, $k$, (see fig. 1.) Malt liquor is generally discharged from the coppers at a temperature of about 200° Fahrenheit, which must be reduced to from 46° to 60°, according to the season of the year, before the liquor can be admitted to the fermenting-vats. This hot liquor is conducted from the coppers by a pipe, $x$, (fig. 1,) and is discharged into the compartment bounded by the draining-sieves $a$, $a^1$, and $a^2$, by which the hops are separated from the thin liquor, the latter spreading itself over the bottom of the box A, where it is partially cooled by exposure to the air. Spring water at a temperature of about 62° is discharged by a pipe, $y$, (fig. 1,) into the box B, the flat pipes $d$ and lower portion of the vessels C and $C'$ being submerged in the same, as shown in fig. 4. The faucet $c$ is then turned so as to open the pipe B, and the hot liquor passes through the fine sieve $a$, by which it is thoroughly strained through the pipe $b$ and into the vessel C. From the latter the liquor is distributed to and flows slowly through the submerged pipes $d$ into the vessel $C'$, the hot vapor passing off through the tubes $f$ and $f'$. The faucet $h$ is next turned, and the liquor continues to flow, passing through the pipe $g$, and into the vessel F. The box D is filled or partly filled with ice, which is in contact with and rests upon the pipes $d$, so that as the liquor passes through the latter its temperature is quickly reduced to the required degree, and it is drawn off from the vessel F' through the pipe $j$, and discharged into the ordinary fermenting-vats. If it be found, on testing the liquor in the vessel F', that its temperature is not low enough, the faucets $c$, $h$, and $j$, may be turned slightly so as to cause the liquor to flow more slowly through the several pipes and vessels, and if the liquor is too cold, it is caused in the same manner to flow faster, its temperature being thus regulated to a nicety by operating the several faucets. The great objection to the ordinary apparatus used for cooling malt liquors is the length of time required for the operation, the liquor, especially in the summer season, frequently beginning to ferment before it leaves the cooler. I have found by careful and repeated experiments that by using my invention the liquor can be reduced to a lower degree of temperature, and in less than one-quarter of the usual time required. During the winter season it is not necessary to reduce the temperature of the liquor to so low a point, hence it can be passed more quickly through the apparatus, and cold water may be substituted for ice in the box D. I prefer to use the flattened pipes $d$, as they present an extended cooling surface, but pipes of any shape or construction may be employed without departing from the main features of my invention; and in some instances deep and narrow troughs, open at the top, may be substituted for the tubes or pipes. It will be evident that my apparatus may be used for cooling not only malt, but a variety of other liquors, the rapidity of the flow of the latter, and the degree to which it is cooled, being regulated as before described, by the faucets $c$, $h$, and $j$.

I claim as my invention, and desire to secure by Letters Patent—

1. The box A, having a compartment bounded by sieves $a$, $a^1$, and $a^2$, and inlet and outlet pipes, all arranged substantially as and for the purpose herein set forth.

2. The cooling-box B, containing the vessels C and C', and pipes or troughs $d\,d$, the whole being constructed and arranged substantially as and for the purpose specified.

3. The tubes $d\,d$ and $f\,f'$, in combination with the vessels C and C' of the box B, or with the vessels F F' of the box D.

4. The combination of the boxes A, B, and D, with the contents described, or their equivalents, and with the regulating faucets specified.

In testimony whereof I have signed my name to this specification in the presence of two subscribing witnesses

WILLIAM PARTINGTON.

Witnesses:
  H. HOWSON,
  W. J. R. DELANY.